US012728402B2

(12) United States Patent
Won et al.

(10) Patent No.: US 12,728,402 B2
(45) Date of Patent: Sep. 8, 2026

(54) PREPARATION METHOD FOR SUPERABSORBENT POLYMER

(71) Applicant: LG Chem, Ltd., Seoul (KR)

(72) Inventors: Tae Young Won, Daejeon (KR); Jungmin Sohn, Daejeon (KR); Hyemin Lee, Daejeon (KR); Jihye Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 764 days.

(21) Appl. No.: 18/008,254

(22) PCT Filed: Nov. 17, 2021

(86) PCT No.: PCT/KR2021/095105

§ 371 (c)(1),
(2) Date: Dec. 5, 2022

(87) PCT Pub. No.: WO2022/108430

PCT Pub. Date: May 27, 2022

(65) Prior Publication Data

US 2023/0330629 A1 Oct. 19, 2023

(30) Foreign Application Priority Data

Nov. 18, 2020 (KR) ........................ 10-2020-0154962
Nov. 17, 2021 (KR) ........................ 10-2021-0158413

(51) Int. Cl.

| | |
|---|---|
| ***B01J 20/28*** | (2006.01) |
| ***B01J 20/26*** | (2006.01) |
| ***B01J 20/32*** | (2006.01) |
| ***C08F 2/26*** | (2006.01) |
| ***C08F 2/44*** | (2006.01) |
| ***C08F 220/06*** | (2006.01) |
| ***C08F 222/10*** | (2006.01) |
| ***C08K 7/02*** | (2006.01) |

(52) U.S. Cl.

CPC ....... *B01J 20/28007* (2013.01); *B01J 20/261* (2013.01); *B01J 20/28047* (2013.01); *B01J 20/3282* (2013.01); *C08F 2/26* (2013.01); *C08F 2/44* (2013.01); *C08F 220/06* (2013.01); *C08F 222/102* (2020.02); *C08K 7/02* (2013.01); *B01J 2220/68* (2013.01); *C08K 2201/004* (2013.01); *C08K 2201/011* (2013.01)

(58) Field of Classification Search

CPC ................ B01J 20/28007; B01J 20/261; B01J 20/28047; B01J 20/3282; B01J 222/68; C08F 222/102; C08F 2/26; C08F 2/44; C08F 220/06; C08K 7/02; C08K 2201/004; C08K 2201/011

USPC ........................................................ 502/402

See application file for complete search history.

(56) References Cited

U.S. PATENT DOCUMENTS

| | | | |
|---|---|---|---|
| 5,422,405 | A | 6/1995 | Dairoku et al. |
| 9,162,007 | B2 | 10/2015 | Bitis et al. |
| 2010/0062165 | A1 | 3/2010 | Suzuki et al. |
| 2011/0301027 | A1 | 12/2011 | Bitis et al. |
| 2016/0311985 | A1 | 10/2016 | Jung et al. |
| 2018/0163004 | A1 | 6/2018 | Nishiumi et al. |
| 2018/0289854 | A1 | 10/2018 | Varona et al. |
| 2019/0085104 | A1 | 3/2019 | Yoon et al. |
| 2019/0119452 | A1 | 4/2019 | Yoon et al. |
| 2020/0398251 | A1 | 12/2020 | Choi et al. |
| 2021/0008521 | A1 | 1/2021 | Choi et al. |

FOREIGN PATENT DOCUMENTS

| | | | |
|---|---|---|---|
| JP | H06184320 | A | 7/1994 |
| JP | 2012512739 | A | 6/2012 |
| JP | 2015071125 | A | 4/2015 |
| JP | 2019001872 | A | 1/2019 |
| JP | 2019006899 | A | 1/2019 |
| JP | 201965414 | A | 4/2019 |
| JP | 2019518815 | A | 7/2019 |
| JP | 2020059956 | A | 4/2020 |
| KR | 20000069445 | A | 11/2000 |
| KR | 20150067729 | A | 6/2015 |
| KR | 20160034317 | A | 3/2016 |
| KR | 20170011697 | A | 2/2017 |
| KR | 20180018737 | A | 2/2018 |
| KR | 20180074586 | A | 7/2018 |
| KR | 20180075309 | A | 7/2018 |
| KR | 20190122213 | A | 10/2019 |
| KR | 20200071654 | A | 6/2020 |
| KR | 20200071658 | A | 6/2020 |
| KR | 20200071662 | A | 6/2020 |
| WO | 2013009225 | A1 | 1/2013 |
| WO | 2015012273 | A1 | 1/2015 |
| WO | 2015050049 | A1 | 4/2015 |
| WO | 2017018554 | A1 | 2/2017 |
| WO | 2017051734 | A1 | 3/2017 |

OTHER PUBLICATIONS

Schwalm, R. "UV Coatings Basics, Recent Developments and New Applications" Elsevier Science, Dec. 2006, p. 115, ISBN-13: 978-0444529794.

(Continued)

*Primary Examiner* — In Suk C Bullock
(74) *Attorney, Agent, or Firm* — Lerner David LLP

(57) ABSTRACT

A method of preparing a superabsorbent polymer and the superabsorbent polymer maintaining excellent basic absorption performances such as centrifuge retention capacity, while exhibiting improved gel strength and absorption rate are provided. The nanocellulose fiber is introduced during the preparation of the superabsorbent polymer to improve mechanical strength, to form a porous structure, and to rapidly absorb the surrounding water through capillary action and delivering the water to the inside of the superabsorbent polymer.

16 Claims, No Drawings

(56) References Cited

OTHER PUBLICATIONS

Odian, G. "Principles of Polymerization" John Wiley & Sons, Inc, Dec. 1981, p. 203, ISBN: 0-471-05146-2.

International Search Report for Application No. PCT/KR2021/095105 mailed Mar. 2, 2022, pp. 1-3.

Saito, T. "Strength analysis of single cellulose nanofibers," Grant-in-Aid for Challenging Exploratory Research, Jun. 17, 2017, pp. 1-4. [English Translation of Abstract only].

PREPARATION METHOD FOR SUPERABSORBENT POLYMER

CROSS-REFERENCE TO RELATED APPLICATION

The present application is a national phase entry under 35 U.S.C. § 371 of International Application No. PCT/KR2021/095105 filed on Nov. 17, 2021, which claims priority from Korean Patent Application Nos. 10-2020-0154962 and 10-2021-0158413, filed on Nov. 18, 2020, and Nov. 17, 2021, respectively, the disclosures of which are hereby incorporated by reference herein in their entirety.

TECHNICAL FIELD

The present invention relates to a method of preparing a superabsorbent polymer having an improved initial absorption rate while maintaining excellent absorption performances.

BACKGROUND ART

A superabsorbent polymer (SAP) is a synthetic polymeric material capable of absorbing moisture from 500 to 1000 times its own weight. Since such superabsorbent polymers started to be practically applied in sanitary products, now they have been widely used not only for hygiene products such as paper diapers for children, etc., but also for water retaining soil products for gardening, water stop materials for the civil engineering and construction, sheets for raising seedling, fresh-keeping agents for food distribution fields, materials for poultice or the like.

In most cases, these superabsorbent polymers have been widely used in the field of hygienic materials such as diapers, sanitary pads, etc. For these applications, superabsorbent polymers are required to exhibit high absorbency with respect to water, etc., and to exhibit excellent absorption properties such as not to release the absorbed water even under an external pressure, etc. Recently, superabsorbent polymers are more required to have an absorption rate that more quickly absorbs and retains a target solution such as water, etc. Basically, absorption of an aqueous solution by the superabsorbent polymer occurs on the surface of the polymer, and to improve the absorption rate, a method of increasing the surface area of the superabsorbent polymer may be considered. Accordingly, a method of reducing a particle size of the superabsorbent polymer or a method of forming a porous structure has been considered as a method of increasing the absorption rate.

For example, to form the porous structure in the superabsorbent polymer, a method of preparing the superabsorbent polymer by adding a foaming agent has been suggested. However, as the content of the foaming agent is higher, the absorption rate may be improved to a certain level, but generation of fine powder of the superabsorbent polymer is increased due to excessive foam generation. Therefore, there is a problem in that the gel strength is deteriorated. Further, basic absorption properties of the superabsorbent polymer tends to decrease with decreasing particle size. Therefore, there has been a limitation in improving the absorption rate while maintaining the basic absorption capacity by the previously known method.

DISCLOSURE

Technical Problem

To solve the problems of the prior art, there is provided a method of preparing a superabsorbent polymer having excellent basic absorption performances such as water retention capacity while exhibiting improved gel strength and initial absorption rate.

Technical Solution

To achieve the above object, there is provided a method of preparing a superabsorbent polymer, the method including the steps of:

a) mixing a water-soluble ethylene-based unsaturated monomer, an internal crosslinking agent, and a solvent to prepare a first monomer mixture;
b) introducing a nanocellulose fiber having a width of 3 nm to 50 nm, a length of 1 μm to 5 μm, and a tensile strength of 2,000 MPa or more, and a surfactant while shear mixing the first monomer mixture to prepare a second monomer mixture;
c) introducing a polymerization initiator to the second monomer mixture to prepare a third monomer mixture;
d) polymerizing the third monomer mixture to prepare a water-containing gel polymer;
e) chopping the water-containing gel polymer;
f) drying, pulverizing, and size-sorting the water-containing gel polymer to prepare a base polymer; and
g) carrying out an additional crosslinking of the surface of the base polymer in the presence of a surface crosslinking agent to form a surface-crosslinked layer.

Further, there is provided a superabsorbent polymer having a gel strength of 10,000 Pa or more, the superabsorbent polymer including:

base polymer particles including a crosslinked polymer which is obtained by crosslinking polymerization of a water-soluble ethylene-based unsaturated monomer in the presence of an internal crosslinking agent;
a surface-crosslinked layer which is formed on the surface of the base polymer particles and is obtained by additional crosslinking of the crosslinked polymer via a surface crosslinking agent; and
a nanocellulose fiber having a width of 3 nm to 50 nm, a length of 1 μm to 5 μm, and a tensile strength of 2,000 MPa or more, which is incorporated with the base polymer.

Effect of the Invention

According to a method of preparing a superabsorbent polymer of the present invention, it is possible to provide a superabsorbent polymer having excellent basic absorption performances such as centrifuge retention capacity, etc. while exhibiting improved gel strength and initial absorption rate.

BEST MODE FOR CARRYING OUT THE INVENTION

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

The present invention may be variously modified and have various forms, and specific examples are illustrated and explained in detail below. However, it is not intended to limit the present invention to the specific examples and it must be understood that the present invention includes every modifications, equivalents, or replacements included in the spirit and technical scope of the present invention.

As used herein, the "base polymer" or "base polymer powder", which is prepared in the form of particles or powder by drying and pulverizing a polymer obtained by polymerizing a water-soluble ethylene-based unsaturated monomer, refers to a polymer without surface modification or surface crosslinking.

Hereinafter, a method of preparing a superabsorbent polymer of the present invention will be descried in more detail.

A method of preparing a superabsorbent polymer according to one embodiment of the present invention may include the steps of:

a) mixing a water-soluble ethylene-based unsaturated monomer, an internal crosslinking agent, and a solvent to prepare a first monomer mixture;
b) introducing a nanocellulose fiber having a width of 3 nm to 50 nm, a length of 1 μm to 5 μm, and a tensile strength of 2,000 MPa or more, and a surfactant while shear mixing the first monomer mixture to prepare a second monomer mixture;
c) introducing a polymerization initiator to the second monomer mixture to prepare a third monomer mixture;
d) polymerizing the third monomer mixture to prepare a water-containing gel polymer;
e) chopping the water-containing gel polymer;
f) drying, pulverizing, and size-sorting the water-containing gel polymer to prepare a base polymer; and
g) carrying out an additional crosslinking of the surface of the base polymer in the presence of a surface crosslinking agent to form a surface-crosslinked layer.

Hereinafter, each step of the present invention will be described in more detail.

First, a) the first monomer mixture is prepared by mixing the water-soluble ethylene-based unsaturated monomer, the internal crosslinking agent, and the solvent.

The water-soluble ethylene-based unsaturated monomer may be any monomer commonly used in the preparation of superabsorbent polymers without particular limitation. Herein, any one or more monomers selected from the group consisting of an anionic monomer and salts thereof, a nonionic hydrophilic monomer and an unsaturated monomer containing an amino group, and a quaternary compound thereof may be used.

Specifically, one or more selected from the group consisting of an anionic monomer such as (meth)acrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxypolyethyleneglycol(meth)acrylate, or polyethyleneglycol(meth)acrylate; and an unsaturated monomer containing an amino group such as (N,N)-dimethylaminoethyl (meth)acrylate or (N,N)-dimethylaminopropyl(meth) acrylamide, and a quaternary compound thereof may be used.

More preferably, acrylic acid or salts thereof, for example, acrylic acid or alkali metal salts thereof such as sodium salts thereof may be used, and it is possible to prepare a superabsorbent polymer having superior physical properties by using these monomers. When the alkali metal salt of acrylic acid is used as the monomer, acrylic acid may be used after being neutralized with a basic compound such as caustic soda (NaOH).

A concentration of the water-soluble ethylene-based unsaturated monomer may be about 20% by weight to about 60% by weight, preferably, about 40% by weight to about 50% by weight, based on the third monomer mixture including raw materials of the superabsorbent polymer and a solvent, and the concentration may be properly controlled, considering polymerization time and reaction conditions. However, when the monomer concentration is too low, the yield of the superabsorbent polymer may become low and an economic problem may occur. On the contrary, when the concentration is too high, there is a process problem in that a part of the monomers is precipitated, or pulverization efficiency is lowered upon pulverization of the polymerized water-containing gel polymer, and the physical properties of the superabsorbent polymer may deteriorate.

As the internal crosslinking agent, a crosslinking agent having one or more functional groups capable of reacting with a water-soluble substituent of the water-soluble ethylene-based unsaturated monomer and having one or more ethylenically unsaturated groups; or a crosslinking agent having two or more functional groups capable of reacting with the water-soluble substituent of the monomer and/or a water-soluble substituent formed by hydrolysis of the monomer may be used.

Specific examples of the internal crosslinking agent may include bisacrylamide having 8 to 12 carbon atoms, bismethacrylamide, poly(meth)acrylate of a polyol having 2 to 10 carbon atoms, poly(meth)allylether of a polyol having 2 to 10 carbon atoms, etc. More specifically, one or more selected from the group consisting of N,N'-methylenebis (meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallylamine, triarylcyanurate, triallylisocyianate, polyethyleneglycol, diethyleneglycol and propyleneglycol may be used.

Further, as the internal crosslinking agent, an epoxy compound including one or more epoxy groups may be used. In this regard, the epoxy compound may further include one or more functional groups capable of reacting with the water-soluble ethylene-based unsaturated monomer, in addition to the epoxy groups. Specific examples thereof may include polyvalent epoxy compounds such as ethylene glycol diglycidyl ether, polyethylene glycol diglycidyl ether, glycerol polyglycidyl ether, propylene glycol diglycidyl ether, polypropylene glycol diglycidyl ether, etc.

These internal crosslinking agents may be used in combination of two or more thereof, and may be included at a concentration of about 0.01% by weight to about 0.5% by weight, based on 100% by weight of the water-soluble ethylene-based unsaturated monomer, thereby crosslinking the polymerized polymer.

The solvent may be used without limitations in view of constitution as long as it is able to dissolve the above components. For example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination. Preferably, water may be used as the solvent.

The solvent may be additionally introduced in the steps b) and c) of preparing the second and third monomer mixtures, as well as in the step a). The raw materials added to the first to third monomer mixtures, i.e., the water-soluble ethylene-based unsaturated monomer, internal crosslinking agent, nanocellulose fiber, surfactant, polymerization initiator, and other additives may be prepared in the form of a solution, in which they are mixed with the solvent, and the raw materials in the form of the solution may be introduced during preparation of the first to third monomer mixtures. The solvent in the third monomer mixture finally prepared may be included in a residual quantity except for the raw materials.

Next, b) the second monomer mixture is prepared by introducing the surfactant and the nanocellulose fiber while shear mixing the first monomer mixture.

The nanocellulose fiber is introduced during the preparation of the superabsorbent polymer to improve mechanical strength of superabsorbent polymer particles and to form a porous structure in the particles. Further, the nanocellulose fiber introduced during the preparation of the superabsorbent polymer is uniformly incorporated inside and outside the crosslinking structure of the crosslinked polymer included in the superabsorbent polymer particles, thereby rapidly absorbing the surrounding water through capillary action and delivering the water to the inside of the superabsorbent polymer particles. Due to the porous structure and the incorporated nanocellulose fibers, the superabsorbent polymer prepared according to the present invention may have excellent basic absorption properties such as water retention capacity, and may also exhibit an improved initial absorption rate.

The nanocellulose fiber refers to a nano-sized rod-shaped fiber in which cellulose chains are tightly combined to form a bundle. In this regard, the 'nano-size' of the fiber may mean that its width satisfies about 100 nm or less.

In the present invention, a nanocellulose fiber having a width of 50 nm or less is used as the nanocellulose fiber. Preferably, a nanocellulose fiber having a width of 3 nm to 50 nm and a length of 1 μm to 5 μm is used.

When the width of the nanocellulose fiber is less than 3 nm or the length thereof is less than 1 μm, there may be a problem in that the nanocellulose fiber is separated or detached from the superabsorbent polymer during a pulverization process.

Further, when the width of the nanocellulose fiber is more than 50 nm or the length thereof is more than 5 μm, its uniform dispersion in the superabsorbent polymer is difficult, and agglomeration thereof may occur. Accordingly, it is preferable to satisfy the above range. The width and length of the cellulose fiber may be measured using an optical or electron microscope. Specifically, 100 fibers are randomly selected, the width and length of individual fibers are measured through an optical or electron microscope, and the average value thereof is calculated to confirm the width and length of the nanocellulose fiber.

Specifically, the nanocellulose fiber may have a width of 5 nm or more, and 40 nm or less, or 35 nm or less. Further, the nanocellulose fiber may have a length of 1.2 μm or more, or 1.5 μm or more, and 4.5 μm or less, or 4.0 μm or less.

Since the nanocellulose fiber has excellent mechanical strength, thereby improving particle strength and gel strength of the superabsorbent polymer. Specifically, the nanocellulose fiber may have a tensile strength in the range of 2,000 MPa or more, or 3,000 MPa or more, or 4,000 MPa or more, or 6,000 MPa or more, and 20,000 MPa or less, 17,000 MPa or less, or 15,000 MPa or less. When the tensile strength of the nanocellulose fiber is less than 2,000 MPa, it is difficult to secure the effect of improving the particle strength and gel strength. When the tensile strength is more than 20,000 MPa, there may be a difficulty in handling during the preparation process of the superabsorbent polymer. The tensile strength of the nanocellulose fiber may be measured according to ASTM C1557-14 (Standard Test Method for Tensile Strength and Young's Modulus of Fibers).

The nanocellulose fiber may be introduced in an amount of 0.001 part by weight or more, 0.01 part by weight or more, or 0.1 part by weight or more, and 10 parts by weight or less, or 5 parts by weight or less, or 1 part by weight or less, based on 100 parts by weight of the water-soluble ethylene-based unsaturated monomer.

When the input amount of the nanocellulose fiber satisfies the above range, the content of nanocellulose fiber may be in the range of 0.0001% by weight to 10% by weight, based on 100% by weight of the superabsorbent polymer to be prepared.

When the content of the nanocellulose fiber is less than 0.0001% by weight, based on 100% by weight of the superabsorbent polymer, the porous structure is hardly formed, and the gel strength and particle strength of the superabsorbent polymer are not sufficient, and it is difficult to secure the effect of improving the absorption rate. Further, when the content of the nanocellulose fiber is more than 10% by weight, based on 100% by weight of the superabsorbent polymer, agglomeration of the nanocellulose fiber occurs, and the porous structure is hardly formed inside the superabsorbent polymer, which is not preferred.

Meanwhile, when the nanocellulose fiber is introduced to the first monomer mixture, the surfactant is introduced together such that the nanocellulose fiber is uniformly dispersed.

As the surfactant, anionic, cationic, amphoteric, or nonionic surfactants having 10 or more carbon atoms, preferably, 10 to 50 carbon atoms may be used alone or in combination. As the surfactant, a nonionic surfactant having 10 to 30 carbon atoms such as fatty acid sodium, sulfonate, or sorbitan ester may be preferably used, and sorbitan ester compounds such as Span® 20 (sorbitan monolaurate), or Span® 80 (sorbitan monooleate) may be more preferably used. These nonionic surfactants are preferred because of its high dispersibility and ease of use in the monomer mixture using the above-described solvent.

To secure the above effect, the surfactant may be used in an amount of 0.01 part by weight to 1 part by weight, or 0.05 parts by weight to 0.5 parts by weight, based on 100 parts by weight of the water-soluble ethylene-based unsaturated monomer.

In one embodiment of the present invention, when the nanocellulose fiber and the surfactant are introduced, high-shear mixing is performed so that the nanocellulose may be more uniformly dispersed.

The high-shear mixing means mixing by applying a mechanical force at a shear rate of 6 $s^{-1}$ or more, 7 $s^{-1}$ or more, or 10 $s^{-1}$ or more, and 30 $s^{-1}$ or less, or 20 $s^{-1}$ or less. The high-shear mixing may be accomplished by a method of mixing by rotation by a stirring shaft or by a pressure difference, a method of mixing by a flow rate, or the like. According to one embodiment of the present invention, the high-shear mixing may be achieved by high-speed stirring using a homogenizer, but the high-shear mixing method and the used apparatus are not limited thereto.

When the nanocellulose fibers are introduced and dispersed during the high-shear mixing as described above, the nanocellulose fibers may be uniformly distributed in the monomer mixture without agglomeration, and accordingly, micropores may be formed in the polymer during polymerization, and the superabsorbent polymer to be prepared may exhibit uniform physical properties.

Next, c) the third monomer mixture is prepared by introducing the polymerization initiator to the second monomer mixture.

In the method of preparing the superabsorbent polymer of the present invention, the polymerization initiator used in the polymerization is not particularly limited, as long as it is commonly used in the preparation of superabsorbent polymers.

Specifically, the polymerization initiator may be a thermal polymerization initiator or a photopolymerization initiator by UV radiation depending on the polymerization method. However, even in the case of the photopolymerization method, a certain amount of heat is generated by ultraviolet irradiation, etc., and a certain amount of heat is generated in accordance with the progression of the polymerization reaction, which is an exothermic reaction, and therefore, a thermal polymerization initiator may be further included.

As the photopolymerization initiator, a compound capable of forming radicals by a light such as UV may be used without limitations in view of constitution.

For example, one or more selected from the group consisting of benzoin ether, dialkyl acetophenone, hydroxyl alkylketone, phenyl glyoxylate, benzyl dimethyl ketal, acyl phosphine, and α-aminoketone may be used as the photopolymerization initiator. Meanwhile, as the specific example of acyl phosphine, commercially available lucirin TPO, namely, 2,4,6-trimethyl-benzoyl-trimethyl phosphine oxide may be used. More various photopolymerization initiators are well disclosed in "UV Coatings: Basics, Recent Developments and New Application (Elsevier 2007)" written by Reinhold Schwalm, p115, however, they are not limited to the above described examples.

The photopolymerization initiator may be included in an amount of about 0.01% by weight to about 1.0% by weight in the third monomer mixture. When the concentration of the photopolymerization initiator is too low, the polymerization rate may become low. When the concentration of the photopolymerization initiator is too high, the molecular weight of the superabsorbent polymer may become low and its physical properties may not be uniform.

Further, one or more selected from the group consisting of persulfate-based initiators, azo-based initiators, hydrogen peroxide, and ascorbic acid may be used as the thermal polymerization initiator. Examples of the persulfate-based initiators may include sodium persulfate ($Na_2S_2O_8$), potassium persulfate ($K_2S_2O_8$), ammonium persulfate ($(NH_4)_2S_2O_8$) or the like. Examples of the azo-based initiators may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis(2-[2-imidazolin-2-yl]propane)dihydrochloride, 4,4-azobis-(4-cyanovaleric acid) or the like. More various thermal polymerization initiators are well-disclosed in 'Principle of Polymerization (Wiley, 1981)' written by Odian, p203, however, they are not limited to the above described examples.

The thermal polymerization initiator may be included in an amount of about 0.001% by weight to about 0.5% by weight in the third monomer mixture. When the concentration of the thermal polymerization initiator is too low, additional thermal polymerization hardly occurs, and thus the addition effect of the thermal polymerization initiator may be insignificant. When the concentration of the thermal polymerization initiator is too high, the molecular weight of the superabsorbent polymer may become low and its physical properties may become uneven.

Meanwhile, during the preparation of the first to third monomer mixtures, additives such as a thickener, a plasticizer, a preservation stabilizer, an antioxidant, etc., may be further included, if necessary.

Next, d) the water-containing gel polymer is prepared by polymerizing the third monomer mixture.

The polymerization of the third monomer mixture may be carried out by any common polymerization method without particular limitations in view of constitution.

Specifically, the polymerization method is largely classified into the thermal polymerization and the photopolymerization according to a polymerization energy source. The thermal polymerization may be commonly carried out in a reactor like a kneader equipped with agitating spindles whereas the photopolymerization may be carried out in a reactor equipped with a movable conveyor belt. The above-described polymerization method is an example only, and the present invention is not limited to the above-described polymerization methods.

For example, the water-containing gel polymer, which is obtained by performing thermal polymerization while providing hot air to the above-described reactor like a kneader equipped with the agitating spindles or heating the reactor, may have a size of centimeters or millimeters when it is discharged from an outlet of the reactor, according to the type of agitating spindles equipped in the reactor. Specifically, the size of the obtained water-containing gel polymer may vary depending on a concentration of the mixture fed thereto, a feeding speed or the like, and the water-containing gel polymer having a weight average particle size of 2 mm to 50 mm may be generally obtained.

Further, as described above, when the photopolymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer mixture fed thereto and the feeding speed. Usually, it is preferable to supply the monomer mixture so that a sheet-like polymer having a thickness of about 0.5 cm to about 5 cm may be obtained. When the monomer mixture is supplied to such an extent that the thickness of the sheet-like polymer becomes too thin, it is undesirable because the production efficiency is low, and when the thickness of the sheet-like polymer is more than 5 cm, the polymerization reaction may not evenly occur over the entire thickness because of the excessive thickness.

The water-containing gel polymer obtained by the above-mentioned method may have a water content of about 40% by weight to about 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

Next, e) the step of chopping the prepared water-containing gel polymer is carried out.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the step e) may be carried out so that the particle diameter of the water-containing gel polymer becomes about 2 mm to about 20 mm.

Coarse pulverizing into a particle diameter of less than 2 mm is not technically easy due to the high water content of the water-containing gel polymer, and an agglomeration phenomenon between the pulverized particles may occur. Meanwhile, when the polymer is coarsely pulverized into a particle diameter of greater than 20 mm, the effect of increasing the efficiency in the subsequent drying step may be insignificant.

Preferably, the step e) may be carried out so that the particle diameter of the water-containing gel polymer is in the range of 1 mm to 15 mm. In this range of the particle diameter, the efficiency of the drying step may be improved. Pulverizing of the water-containing gel polymer into a particle diameter of less than 1 mm is not technically easy due to the high water content of the water-containing gel polymer, and an agglomeration phenomenon between the pulverized particles may occur. When the particle diameter of the water-containing gel polymer is greater than 15 mm, the efficiency of the drying step may be decreased.

Next, f) a base polymer is prepared by drying, pulverizing, and size-sorting the mixture.

In this regard, a drying temperature of the drying step may be about 150° C. to about 200° C. When the drying temperature is lower than 150° C., it is apprehended that the drying time becomes too long and the physical properties of the final superabsorbent polymer may be deteriorated. When the drying temperature is higher than 200° C., it is apprehended that only the polymer surface is excessively dried, and thus fine powder may be generated during the subsequent pulverization process, and the physical properties of the superabsorbent polymer finally formed may be deteriorated. Therefore, the drying may be preferably performed at a temperature of about 150° C. to about 200° C., and more preferably at a temperature of about 160° C. to about 180° C.

Meanwhile, the drying step may be carried out for about 20 minutes to about 1 hour, in consideration of the process efficiency, but is not limited thereto.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation or ultraviolet irradiation. When the drying step as above is finished, the water content of the polymer may be about 0.1% by weight to about 10% by weight.

Next, the dried mixture obtained through the drying step is pulverized.

The polymer powder obtained through the pulverizing step may have a particle diameter of about 150 μm to about 850 μm. Specific examples of a pulverizer that may be used to achieve the above particle diameter may include a pin mill, a hammer mill, a screw mill, a roll mill, a disc mill, a jog mill, etc., but the present invention is not limited to the above-described examples.

In order to manage the physical properties of the superabsorbent polymer powder that is finally commercialized after the pulverization step, the polymer powder obtained after the pulverization may be generally size-sorted according to the particle size. Preferably, the polymer powder may be sorted into particles having a particle size of less than 150 μm, particles having a particle size of about 150 μm to about 850 μm, and particles having a particle size of more than about 850 μm.

Next, g) the surface-crosslinking step of forming the surface-crosslinked layer by additionally crosslinking the surface of the base polymer in the presence of a surface crosslinking agent is carried out.

The surface-crosslinking step is a step of producing a superabsorbent polymer having more improved physical properties by inducing a crosslinking reaction on the surface of the base polymer particles in the presence of a surface crosslinking agent. Through the surface crosslinking, a surface-crosslinked layer (a surface-modified layer) is formed on the surface of the pulverized polymer particles.

Generally, surface crosslinking agents are applied on the surface of the superabsorbent polymer particles such that surface crosslinking reactions occur on the surface of the superabsorbent polymer particles, which improves crosslinkability on the surface of the particles without substantially affecting the interior of the particles. Therefore, the surface-crosslinked superabsorbent polymer particles have a higher degree of crosslinking near the surface than in the interior.

As the surface crosslinking agent, surface crosslinking agents which have been used in the preparation of the superabsorbent polymer may be used without particular limitation. More specific examples thereof may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol, and glycerol; one or more carbonate-based compounds selected from the group consisting of ethylene carbonate and propylene carbonate; epoxy compounds such as ethylene glycol diglycidyl ether, etc.; oxazolidinone compounds; polyamine compounds; oxazoline compounds; mono-, di-, or polyoxazolidinone compounds; or cyclic urea compounds, etc.

Such a surface crosslinking agent may be used in an amount of about 0.01 part by weight to about 5 parts by weight, based on 100 parts by weight of the base polymer. By controlling the content of the surface crosslinking agent in the above range, it is possible to provide a superabsorbent polymer exhibiting excellent absorption properties.

The surface crosslinking agent may be mixed with the base polymer in a dry manner, or may be added in the form of a surface crosslinking solution. As a solvent for the surface crosslinking solution, water, methanol, ethanol, propylene glycol, or a combination thereof may be used, but is not limited thereto.

Meanwhile, in the surface-crosslinking step, in addition to the above-described surface crosslinking agent, a multivalent metal salt, an inorganic filler, a thickener, or the like may be further included, as needed. These additives may be mixed with the base polymer in a dry manner or may be mixed in the form of being added to the surface crosslinking solution.

The multivalent metal salt may include, for example, one or more selected from the group consisting of an aluminum salt, more specifically, sulfates, potassium salts, ammonium salts, sodium salts, and hydrochloride salts of aluminum.

As the multivalent metal salt is additionally used, the liquid permeability of the superabsorbent polymer prepared by the method of one embodiment may be further improved. The multivalent metal salt may be added, together with the surface crosslinking agent, to the surface crosslinking solution, and may be used in an amount of 0.01 part by weight to 4 parts by weight based on 100 parts by weight of the base polymer.

The inorganic filler may include silica, aluminum oxide, or silicate. The inorganic filler may be included in an amount of 0.01 part by weight to 0.5 parts by weight, based on 100 parts by weight of the base polymer powder. These inorganic fillers may act as a lubricant to improve the application efficiency of the surface crosslinking solution on the surface of the superabsorbent polymer, and to further improve the liquid permeability of the prepared superabsorbent polymer.

Further, a thickener may be further included in the surface crosslinking step. When the surface of the base polymer powder is further crosslinked in the presence of the thickener, it is possible to minimize the deterioration of the physical properties even after the pulverization. Specifically, as the thickener, one or more selected from polysaccharides and a hydroxy-containing polymers may be used. The polysaccharides may include gum-type thickeners, cellulose-type thickeners, etc. Specific examples of the gum-type thickeners include xanthan gum, arabic gum, karaya gum, tragacanth gum, ghatti gum, guar gum, locust bean gum, *psyllium* seed gum, etc. Specific examples of the cellulose-type thickeners may include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, methylhydroxypropyl cellulose, etc. Meanwhile, specific examples of the hydroxy-containing polymer may include polyethylene glycol, polyvinyl alcohol, etc.

The surface crosslinking reaction may be carried out by heating the mixture of the pulverized water-containing gel polymer, the surface crosslinking agent, and the fiber.

The surface crosslinking reaction may be carried by heating at a temperature of 185° C. or higher, preferably, at a temperature of about 185° C. to about 230° C. for about 10 minutes to about 90 minutes, and preferably, for about 20 minutes to about 70 minutes. When the crosslinking reaction temperature is lower than 185° C. or the reaction time is too short, there may be a problem in that the surface crosslinking agent is not sufficiently reacted with the water-containing gel polymer, and when the crosslinking reaction temperature is higher than 230° C. or the reaction time is too long, there may be a problem in that the water-containing gel polymer is degraded and thus its physical properties may deteriorate.

A means for raising the temperature for the surface crosslinking reaction is not particularly limited. Heating may be performed by providing a heating medium or by directly providing a heat source. In this regard, the kind of the applicable heating medium may be steam, hot air, a hot fluid such as hot oil or the like, but the present invention is not limited thereto. The temperature of the heating medium to be provided may be properly controlled in consideration of the means of the heating medium, the heating rate, and the target temperature. Meanwhile, as the heat source to be directly provided, an electric heater or a gas heater may be used, but the present invention is not limited to these examples.

By the above surface crosslinking step, a surface-modified layer may be formed on the surface of the polymer.

The superabsorbent polymer prepared by the preparation method of the present invention may exhibit a high gel strength while having a porous structure. Accordingly, the superabsorbent polymer prepared according to the present invention has excellent basic absorption capacity and excellent gel strength and particle strength, and exhibits a remarkably improved initial absorption rate.

Therefore, according to one embodiment of the present invention, provided is a superabsorbent polymer including base polymer particles including the crosslinked polymer which is obtained by crosslinking polymerization of the water-soluble ethylene-based unsaturated monomer in the presence of the internal crosslinking agent; the surface-crosslinked layer which is formed on the surface of the base polymer particles and is obtained by additional crosslinking of the crosslinked polymer via a surface crosslinking agent; and the nanocellulose fiber having a width of 50 nm or less, which is incorporated with the base polymer.

Due to the nanocellulose fiber incorporated with the base polymer, the superabsorbent polymer exhibits an improved gel strength, as compared with existing superabsorbent polymers. Specifically, the superabsorbent polymer may have a gel strength of 10,000 Pa or more, or 10,200 Pa or more, and 20,000 Pa or less. A method of measuring the gel strength of the superabsorbent polymer will be described in detail in Examples below.

The content of the nanocellulose fiber may be 0.0001% by weight or more, 0.0005% by weight or more, or 0.001% by weight or more, and 10% by weight or less, 5% by weight or less, or 1% by weight or less, based on 100% by weight of the superabsorbent polymer.

The superabsorbent polymer may have a centrifuge retention capacity (CRC) in the range of about 25 g/g or more, about 28 g/g or more, or about 30 g/g or more, and about 45 g/g or less, about 40 g/g or less, or about 35 g/g or less, as measured according to EDANA WSP 241.3.

The superabsorbent polymer may have absorbency under load (AUL) of 0.7 psi in the range of 20 g/g or more, or 23 g/g or more, and 40 g/g or less, or 30 g/g or less, as measured according to EDANA WSP 242.3.

The superabsorbent polymer may have an absorption rate (vortex time) of 45 seconds or less, 40 seconds or less, or 35 seconds or less, as measured according to a Japanese standard method (JIS K 7224). The lower absorption rate means that the superabsorbent polymer is more excellent. Therefore, the lower limit is not limited, but for example, 10 sec or more, or 20 sec or more.

The superabsorbent polymer may have an absorption capacity at 0.3 psi in the range of 18 g/g or more, 20 g/g or more, or 21 g/g or more, and 30 g/g or less. A method of measuring the absorption capacity at 0.3 psi will be described in detail in Examples below.

Hereinafter, the present invention will be described in more detail with reference to exemplary embodiments. However, the following exemplary embodiments are only for illustrating the present invention, and the content of the present invention is not limited to the following exemplary embodiments. Further, in the following Examples and Comparative Examples, "%" and "part by weight" indicating the content are based on weight, unless otherwise specified.

EXAMPLE

Example 1

A first monomer mixture with a neutralization degree of 72% and a monomer concentration of 43% by weight was prepared using acrylic acid, caustic soda, and 0.5% by weight of polyethylene glycol diacrylate (Mw=523) (based on 100% by weight of acrylic acid) as a crosslinking agent.

While mixing 1 kg of the first monomer mixture using a homogenizer (IKA, 1500 rpm, shear rate of 10 $s^{-1}$), 30 g of an aqueous dispersion including 0.3 g of Span 20 as a nonionic surfactant and a nanocellulose fiber (width of 5 nm, length of 3 μm, tensile strength of 10,000 MPa) at a concentration of 0.3% was added thereto and mixed for 5 minutes to prepare a second monomer mixture.

While continuously stirring the second monomer mixture, 31.0 g of a 0.20% ascorbic solution, 33 g of a 1.1% sodium persulfate solution, 32 g of a 0.16% hydrogen peroxide solution were serially introduced and mixed to prepare a third monomer mixture.

The third monomer mixture was subjected to polymerization by introducing through a feeding zone of a polymerization reactor capable of kneading and polymerizing at the same time. At this time, the temperature of the polymerization reactor was maintained at 900° C. The total polymerization time was 30 minutes, and the finally prepared polymer had a water content of 51%.

Subsequently, the water-containing gel polymer was dried in a hot air dryer at a temperature of 190° C. for 30 minutes, and the dried water-containing gel polymer was pulverized using a pin mill pulverizer. Thereafter, the polymer was sorted into a polymer having an average particle size of less than 150 μm and a polymer having an average particle size of 150 μm to 850 μm by using a sieve. The polymer having a particle size of 150 μm to 850 μm thus sorted was regarded as a base polymer.

Then, a surface treatment solution (1.0% by weight of ethylene carbonate, 3.5% by weight of water, and 0.8% by weight of propylene glycol, based on 100% by weight of the base polymer) was sprayed onto the base polymer to perform a surface treatment reaction of the base polymer at a temperature of 190° C. to 210° C. for 40 minutes.

Then, the polymer was naturally cooled to 55° C., dried, and then a surface-treated superabsorbent polymer having an average particle size of 150 μm to 850 μm was obtained using a sieve. The content of particles having a particle size of 150 μm or less in the superabsorbent polymer was less than 2%.

Example 2

A superabsorbent polymer was prepared in the same manner as in Example 1, except that the input amount of aqueous dispersion including nanocellulose fiber at a concentration of 0.3% was increased to 60 g.

Example 3

A superabsorbent polymer was prepared in the same manner as in Example 1, except that the shear rate of the homogenizer was 20 $s^{-1}$ when the nanocellulose fiber and the surfactant were introduced to the first monomer mixture.

Comparative Example 1

A first monomer mixture with a neutralization degree of 72% and a monomer concentration of 43% by weight was prepared using acrylic acid, caustic soda, and 0.5% by weight of polyethylene glycol diacrylate (Mw=523) (based on 100% by weight of acrylic acid) as a crosslinking agent.

To 1 kg of the first monomer mixture, 31.0 g of a 0.20% ascorbic solution, 33 g of a 1.1% sodium persulfate solution, and 32 g of a 0.16% hydrogen peroxide solution were serially introduced and mixed to prepare a second monomer mixture. The second monomer mixture was subjected to polymerization by introducing through a feeding zone of a polymerization reactor capable of kneading and polymerizing at the same time. At this time, the temperature of the polymerization reactor was maintained at 900° C. The total polymerization time was 30 minutes, and the finally prepared polymer had a water content of 51%.

Subsequently, the water-containing gel polymer was dried in a hot air dryer at a temperature of 190° C. for 30 minutes, and the dried water-containing gel polymer was pulverized using a pin mill pulverizer. Thereafter, the polymer was sorted into a polymer having an average particle size of less than 150 μm and a polymer having an average particle size of 150 μm to 850 μm by using a sieve. The polymer having a particle size of 150 μm to 850 μm thus sorted was regarded as a base polymer.

Then, a surface treatment solution (1.0% by weight of ethylene carbonate, 3.5% by weight of water, and 0.8% by weight of propylene glycol, based on the base polymer) was sprayed onto the base polymer to perform a surface treatment reaction of the base polymer at a temperature of 190° C. to 210° C. for 40 minutes.

Then, the polymer was naturally cooled to 55° C., dried, and then a surface-treated superabsorbent polymer having an average particle size of 150 μm to 850 μm was obtained using a sieve. The content of particles having a particle size of 150 μm or less in the superabsorbent polymer was less than 2%.

Comparative Example 2

A superabsorbent polymer was prepared in the same manner as in Example 1, except that high-shear mixing using a homogenizer was not performed when the nanocellulose fiber and the surfactant were introduced to the first monomer mixture.

Comparative Example 3

A superabsorbent polymer was prepared in the same manner as in Example 1, except that a nanocellulose fiber having a width of 100 nm, a length of 3 μm, and a tensile strength of 10,000 MPa was used.

Comparative Example 4

A superabsorbent polymer was prepared in the same manner as in Example 1, except that a nanocellulose fiber having a width of 5 nm, a length of 7 μm, and a tensile strength of 10,000 MPa was used.

Comparative Example 5

A superabsorbent polymer was prepared in the same manner as in Example 1, except that a nanocellulose fiber having a width of 5 nm, a length of 3 μm, and a tensile strength of 1,000 MPa was used.

Experimental Example: Evaluation of Physical Properties of Superabsorbent Polymer Physical properties of the respective superabsorbent polymers of Examples and Comparative Examples were measured by the following methods, and the results are shown in Table 1.

(1) Centrifuge Retention Capacity (CRC)

The water retention capacity by absorption capacity under no load was measured for each polymer in accordance with EDANA WSP 241.3.

In detail, from the polymers of Examples and Comparative Examples, each polymer size-sorted using #40-50 sieve was obtained. Each polymer W0 (g) (about 2.0 g) was uniformly placed into a nonwoven-fabric-made bag, followed by sealing. Then, the bag was immersed in a physiological saline solution (0.9% by weight) at room temperature. After 30 minutes, the bag was drained at 250 G for 3 minutes with a centrifuge, and the weight W2 (g) of the bag was then measured. Further, the same procedure was carried out using no polymer, and the resultant weight W1 (g) was measured. Thus, CRC (g/g) was calculated from the obtained weights according to the following Equation:

$$\text{CRC (g/g)}=\{[W2\text{ (g)}-W1\text{ (g)}]/W0\text{ (g)}\}-1 \quad \text{[Equation 1]}$$

(2) Absorbency Under Load of 0.7 Psi (0.7 AUL)

Absorbency under load (AUL) under 0.7 psi was measured for each polymer according to EDANA WSP 242.3. When the absorbency under load was measured, the sorted polymer used in the above CRC measurement was used.

In detail, a 400 mesh stainless steel net was installed in the bottom of a plastic cylinder having an internal diameter of 25 mm. The superabsorbent polymer W3 (g) (0.16 g) was uniformly scattered on the stainless steel net under conditions of room temperature and relative humidity of 50%. A piston which may uniformly provide a load of 0.7 psi was put thereon, in which an external diameter of the piston was slightly smaller than 25 mm, there was no gab between the internal wall of the cylinder and the piston, and the jig-jog of the cylinder was not interrupted. At this time, the weight W4 (g) of the apparatus was measured.

After putting a glass filter having a diameter of 90 mm and a thickness of 5 mm in a petri dish having a diameter of 150 mm, 0.9% by weight of an aqueous sodium chloride solution was poured until the surface level of the solution became equal to the upper surface of the glass filter. A sheet of filter paper having a diameter of 90 mm was put on the glass filter. The measurement apparatus was mounted on the filter paper, thereby getting the liquid absorbed under the load for 1 hour. 1 hour later, the weight W5 (g) was measured after lifting the measurement apparatus up.

Absorbency under load (g/g) was calculated from the obtained weights according to the following Equation.

$$0.7AUP\text{ (g/g)}=[W5\text{ (g)}-W4\text{ (g)}]/W3\text{ (g)} \quad \text{[Equation 2]}$$

(3) Absorption Rate (Vortex Time, Sec)

The absorption rate was measured according to the JIS K 7224 standard. In more detail, 2 g of the superabsorbent polymer was added to 50 mL of physiological saline at 25° C., and stirred with a magnetic bar (diameter of 8 mm and length of 31.8 mm) at 600 rpm, and a time taken for vortex to disappear was measured in seconds.

(4) Absorption Capacity Under Load of 0.3 Psi

The absorption capacity under load of 0.3 psi of Examples and Comparative Examples was measured by the following method by modifying the EDANA method WSP 242.3 using a measurement apparatus X shown in FIG. 1 of Korean Patent Publication No. 10-2016-0147283.

The measurement apparatus X was composed of a burette section 1, a tube 2, a measuring platform 3, and a measuring section 4 placed on the measuring platform 3. The burette section 1 was connected to a rubber plug 14 at the top of a burette 10, and an air inlet tube 11 and a cock 12 at the bottom portion thereof, and a cock 13 was installed at the top portion of the air inlet tube 11. The tube 2 was attached between the burette section 1 and the measuring platform 3. The tube 2 had a diameter of 10 mm. A hole of a diameter of 3 mm was made at the central section of the measuring platform 3, and the tube 2 was connected thereto. The measuring section 4 had a cylinder 40, a nylon mesh 41 adhered to the bottom part of the cylinder 40, and a weight 42. The cylinder 40 had an inner diameter of 2.46 cm. The nylon mesh 41 had 325 mesh (sieve opening: 45 μm), and a given amount of the superabsorbent polymer 5 was evenly spread over the nylon mesh 41. The weight 42 was placed on the superabsorbent polymer 5 such that load of 0.3 psi could be evenly applied to the superabsorbent polymer 5.

0.16 g (±0.02 g) of the superabsorbent polymer 5 was evenly spread over the nylon mesh 41 in the cylinder 40, and the weight 42 was placed on the superabsorbent polymer 5. The measuring section 4 was placed so that its center was in alignment with a tube port in the central section of the measuring platform 3.

On the other hand, a cock 12 and a cock 13 at the burette section 1 were closed, and a saline solution (0.9% aqueous sodium chloride solution) adjusted to 25° C. was poured from the top of the burette 10, and the height of the measuring platform 3 was adjusted so that the position (height) of the air inlet tube 11 was 5 cm lower than the top of the measuring platform 3.

The cock 12 and the cock 13 were opened at the same time, and absorption of the superabsorbent polymer 5 was allowed to initiate. After 60 minutes from the time point of initiating the absorption, the saline solution absorption capacity thereof under load of 0.3 psi was calculated by the following equation.

$$\text{Absorption capacity under 0.3 psi(g/g)}=(W7\text{ (g)}-W6\text{ (g)})/\text{weight of superabsorbent polymer(0.16 (g))} \quad \text{[Equation 3]}$$

in Equation 3,

W6 represents the weight of the measuring section 4 before initiating the absorption (i.e., the total weight of superabsorbent polymer (0.16 g)+cylinder 40+nylon mesh 41+weight 42), and W7 represents the weight of the measuring section 4 after 60 minutes from the time point of initiating the absorption.

(5) Gel Strength

A gel strength in a horizontal direction was measured for each superabsorbent polymer of Examples and Comparative Examples.

First, each superabsorbent polymer sample of Examples and Comparative Examples was sieved (30~50 Mesh), and 0.5 g thereof was weighed. The weighed samples were sufficiently swelled in 50 g of a physiological saline solution for 1 hour. Thereafter, the solvent not absorbed therein was removed by using an aspirator for 4 minutes, and the solvent left on the surface of the same was evenly distributed and wiped once with a filter paper.

2.5 g of the swelled superabsorbent polymer was positioned between two plates (a diameter of 25 mm, with a wall of about 2 mm at the bottom for preventing the sample from leaking) of a rheometer, and the gap between the two plates was adjusted to 1 mm. At this time, the gap between the plates was properly adjusted by pressing the plates with a force of about 3 N such that the swelled superabsorbent polymer sample was contacted evenly at the face of the plates).

A linear viscoelastic regime section of strain where the storage modulus and the loss modulus are steady was found by using the rheometer while increasing the strain at oscillation frequency of 10 rad/s. Generally, in the case of a swollen superabsorbent polymer, a strain of 0.1% was imparted in the linear regime section.

The storage modulus and the loss modulus of the swollen polymer were measured using the strain value of the linear regime section at a constant oscillation frequency of 10 rad/s for 60 seconds, respectively. At this time, the obtained storage modulus values were averaged to obtain the gel strength in a horizontal direction. For reference, the loss modulus is measured as a very small value, as compared to the storage modulus.

TABLE 1

| | Comparative Example 1 | Comparative Example 2 | Comparative Example 3 | Comparative Example 4 | Comparative Example 5 | Example 1 | Example 2 | Example 3 |
|---|---|---|---|---|---|---|---|---|
| CRC(g/g) | 32 | 33 | 32 | 32.5 | 33.5 | 33 | 32.5 | 33.1 |
| 0.7 psi AUL (g/g) | 21 | 22 | 22.5 | 22.8 | 20.6 | 23.5 | 24.6 | 24.2 |
| Absorption rate (sec) | 53 | 51 | 51 | 55 | 60 | 35 | 36 | 33 |
| Absorption capacity under 0.3 psi (g/g) | 14 | 17 | 15 | 17 | 13 | 21 | 23 | 22.5 |
| Gel strength(Pa) | 8,200 | 8,700 | 8,500 | 9,100 | 7,900 | 10,200 | 12,000 | 11,200 |

Referring to Table 1, it was confirmed that the superabsorbent polymers of Examples 1 to 3 have excellent basic absorption properties such as centrifuge retention capacity and absorbency under load while exhibiting remarkably improved absorption rate and absorption capacity under load, as compared with those of Comparative Examples. This may be as a result of absorption improvement through the porous structure formed by the nanocellulose fiber and capillary phenomenon. It was also confirmed that the superabsorbent polymers of Examples 1 to 3 have improved mechanical strength due to the nanocellulose fiber incorporated in the base polymer, thereby exhibiting excellent gel strength.

The invention claimed is:

1. A method of preparing a superabsorbent polymer, comprising:

a) mixing a water-soluble ethylene-based unsaturated monomer, an internal crosslinking agent, and a solvent to prepare a first monomer mixture;

b) introducing a nanocellulose fiber having a width of 3 nm to 50 nm, a length of 1 μm to 5 μm, and a tensile strength of 2,000 MPa or more, and a surfactant while shear mixing the first monomer mixture to prepare a second monomer mixture;

c) introducing a polymerization initiator to the second monomer mixture to prepare a third monomer mixture;

d) polymerizing the third monomer mixture to prepare a water-containing gel polymer;

e) chopping the water-containing gel polymer;

f) drying, pulverizing, and size-sorting the water-containing gel polymer to prepare a base polymer; and g) carrying out an additional crosslinking of the surface of the base polymer in the presence of a surface crosslinking agent to form a surface-crosslinked layer and thereby produce the superabsorbent polymer, wherein the shear mixing of the first monomer mixture to prepare the second monomer mixture is performed at a shear rate of 6 $s^{-1}$ or more.

2. The method of claim 1, wherein the nanocellulose fiber has a tensile strength of 3,000 MPa to 20,000 MPa.

3. The method of claim 1, wherein the nanocellulose fiber is included in an amount of 0.001 part by weight to 10 parts by weight, based on 100 parts by weight of the water-soluble ethylene-based unsaturated monomer.

4. The method of claim 1, wherein the surfactant is fatty acid sodium, sulfonate, or sorbitan ester having 10 to 30 carbon atoms.

5. The method of claim 1, wherein the surfactant is included in an amount of 0.01 part by weight to 1 part by weight, based on 100 parts by weight of the water-soluble ethylene-based unsaturated monomer.

6. A superabsorbent polymer having a gel strength of 10,000 Pa or more, comprising:

base polymer particles including a crosslinked polymer which is obtained by crosslinking polymerization of a water-soluble ethylene-based unsaturated monomer in the presence of an internal crosslinking agent;

a surface-crosslinked layer which is formed on the surface of the base polymer particles and is obtained by additional crosslinking of the crosslinked polymer via a surface crosslinking agent; and a nanocellulose fiber having a width of 3 nm to 50 nm, a length of 1 μm to 5 μm, and a tensile strength of 2,000 MPa or more, which is incorporated with the base polymer.

7. The superabsorbent polymer of claim 6, wherein a content of the nanocellulose fiber is 0.0001% by weight to 10% by weight, based on 100% by weight of the superabsorbent polymer.

8. The superabsorbent polymer of claim 6, wherein a centrifuge retention capacity (CRC) is 24 g/g to 45 g/g, as measured according to EDANA WSP 241.3.

9. The superabsorbent polymer of claim 6, wherein absorbency under load (AUL) of 0.7 psi is 23 g/g to 40 g/g, as measured according to EDANA WSP 242.3.

10. The superabsorbent polymer of claim 6, wherein an absorption rate (vortex time) is 55 seconds or less, as measured according to JIS K 7224.

11. The superabsorbent polymer of claim 6, wherein an absorption capacity of 0.3 psi is 18 g/g or more.

12. The method of claim 1, wherein the shear rate is from 6 $s^{1}$ to 20 $s^{-1}$.

13. The superabsorbent polymer of claim 6, wherein the gel strength of the superabsorbent polymer is from 10,000 Pa to 20,000 Pa.

14. The superabsorbent polymer of claim 6, wherein the tensile strength of the nanocellulose fiber is from 2,000 MPa to 20,000 MPa.

15. The superabsorbent polymer of claim 6, wherein the absorption rate (vortex time) is from 10 seconds to 55 seconds, as measured according to JIS K 7224.

16. The superabsorbent polymer of claim 6, wherein the absorption capacity of 0.3 psi is from 18 g/g or more 30 g/g or less.

* * * * *